United States Patent [19]

Kubler

[11] 4,408,923
[45] Oct. 11, 1983

[54] FITTING FOR CONNECTING TWO VERTICALLY ABUTTING BODIES OF FURNITURE

[75] Inventor: Eberhard Kubler, Frommern, Fed. Rep. of Germany

[73] Assignee: Hafele KG, Nagold, Fed. Rep. of Germany

[21] Appl. No.: 241,928

[22] Filed: Mar. 9, 1981

[30] Foreign Application Priority Data

Mar. 12, 1980 [DE] Fed. Rep. of Germany ... 8006733[U]

[51] Int. Cl.³ .............................................. B25G 3/00
[52] U.S. Cl. ..................................... 403/20; 403/231; 403/245; 403/407
[58] Field of Search ............... 403/231, 407, 230, 187, 403/403, 245, 7, 19, 20

[56] References Cited

U.S. PATENT DOCUMENTS

| | | | |
|---|---|---|---|
| 4,047,822 | 9/1977 | Lehmann | 403/245 |
| 4,160,610 | 7/1979 | Austen-Brown et al. | 403/231 X |
| 4,325,649 | 4/1982 | Rock | 403/407 |

Primary Examiner—Andrew V. Kundrat
Attorney, Agent, or Firm—Thomas W. Speckman

[57] ABSTRACT

A fitting for detachably securing two vertically abutting bodies of furniture to be connected to each other in their respective regions of contact. One of the two furniture bodies has attached thereto a projecting fastener bolt having a fastening head. The other piece of furniture is provided with a generally cup-shaped enclosure or casing in a cavity to accommodate a rotatably mounted tensioning member. The head of the fastener bolt is in operative connection with the tensioning member and is adapted to be drawn into the casing when the tensioning member is rotated.

12 Claims, 4 Drawing Figures

FITTING FOR CONNECTING TWO VERTICALLY ABUTTING BODIES OF FURNITURE

BACKGROUND OF THE INVENTION

The present invention relates to a fitting for detachably securing two vertically abutting bodies of furniture to be connected to each other in their respective regions of contact. One of the two furniture bodies has attached thereto a projecting fastener bolt having a fastening head. The other piece of furniture is provided with a generally cup-shaped enclosure or casing in a cavity to accommodate a rotatably mounted tensioning member. The head of the fastener bolt is in operative connection with the tensioning member and is adapted to be drawn into the casing when the tensioning member is rotated.

Fittings for connecting abutting bodies are well know, for example, from German Utility Model Nos. 71 42 379 and 71 49 143 and German Patent No. 17 53 064. In such prior art devices, the tensioning member is provided with a receptacle for a tool, for example, a wrench or a nut driver, for turning the tensioning member, such as for tightening the fitting.

In the prior art fittings, the tensioning member is directly operated by some rotational tool, expending all of the power required for tightening. Moreover, the tensioning angle of the tensioning member is small because the fastener bolt is usually inserted into a radially directed receptacle in the tensioning member. A further disadvantage of the prior art devices is that they have a tendency to inadvertently become loose or disconnected since the self-locking properties between the tensioning surface shape of the tensioning member and the head of the fastener bolt are not sufficiently strong at every tensioning angle of the tensioning member.

SUMMARY OF THE INVENTION

It is an object of the present invention to produce a fitting of the aforementioned type in which substantially greater tensioning forces may be obtained in a simple mechanical fashion, and which nevertheless is in possession of sufficient self-locking forces between the tensioning member and the head of the fastener bolt to prevent inadvertent detachment or loosening of the fitting.

This object is achieved according to the invention by a fitting for disconnectible joining two vertically abutting pieces of furniture in their region of contact, in which one furniture piece is provided with a projecting fastener stud having a fastening head thereon, and the other furniture piece is provided with a cup-shaped casing in a cavity enclosing rotatably mounted tensioning means, in which the head of the fastener bolt is provided with external ribs in a circumferential orientation and directed vertically to the longitudinal axis of the fastener bolt, and in which the tensioning member is constructed in the form of a worm the threads of which gear with the external ribs of the fastening bolt, and in which the fastening bolt is adapted to be inserted from the front side of the casing and the worm is adapted to be turned also from the front side.

In this construction, the external ribs of the fastener bolt is in operative connection with the worm thread over a large area and the tensioning distance of the fastener bolt may be translated into a large angle of rotation of the worm. Thus, a small torque at the worm will deliver large tightening forces to the fastener bolt and this will substantially ease the adjustment of the fitting, while nevertheless insuring sufficient self-locking action of the worm in any rotational position with respect to the external ribs of the fastener bolt.

In one embodiment of the present invention, the insertion of the externally ribbed head of the fastener bolt into the enclosure or casing provided in a recess in the furniture is achieved by inserting the externally ribbed head into an opening in the casing which is dimensioned to accommodate the diameter of the external ribs. Further, the worm is provided on its circumference with a longitudinally directed groove to facilitate the insertion of the externally ribbed fastening head, such groove being dimensioned to meet the diameter of the external ribs and extending parallel to the worm thread.

According to another embodiment, the operation of the tensioning member in the shape of a worm is substantially improved by orienting the rotational axis of the worm at an acute angle to the longitudinal axis of the fastener bolt. This facilitates the accessibility to the worm and the application of a tool. In addition, an advantageous modification of this embodiment of the invention provides for the worm to have a receptacle for a tool installed on the side accessible from the front side of the casing. Such tool receptacle may take the form of a cross slot, a hexagonal adapter, or the like. In another particularly advantageous embodiment, the angle between the rotational axis of the worm and the longitudinal axis of the fastener bolt is 30°, thereby maintaining the large area engagement between the thread of the worm and the external ribs of the fastening head. Also the self-locking properties of the two members in engagement with each other are sufficiently strong.

In another embodiment, the insertion of the worm into the housing or casing, which may be closed at the front side exposed to the viewer, is facilitated by the construction of the casing in the form of two hemispherical or dish-shaped elements, "half-dishes", adapted to be connected to each other by locking means, such as recesses and pins, in the region of the plane of separation. The longitudinal axis of the fastener bolt and the rotational axis of the worm are located in the plane of separation of the casing. It is thus possible to position the worm in the casing before the casing is put together. In the case of a round casing, the plane of separation extends preferably along a given diameter.

The manufacture of the casing, according to yet another embodiment of the invention, is simplified with resulting economies by making the two half-dishes constituting the casing of a plastic material, joined to each other by a film hinge at one end of the plane of separation to form one piece. The structure is molded in the hinged-out condition by injection molding.

The transfer of forces between the worm and the external ribs of the fastening head is optimized when the cross section of the external ribs on the fastening head is that of a trapezoid with two parallel sides or an equilateral trapezoid, and the threads and the pitch of the worm are so dimensioned as to match this particular shape of the external ribs of the fastening head.

The mounting of the worm inside the casing is accomplished according to another embodiment of the invention in that each half-dish of the casing is provided in the region of the plane of separation with semi-cylindrical bearing members for the front side bearing flanges on the worm. These semi-cylindrical bearing members complement each other to form a cylindrical enclosure when the two half-dishes are assembled to form the complete casing. The worm is prevented from axial displacement but is rotatably maintained in the assembled casing. Rotational movement of the worm gear with the externally threaded fastening head will cause the fastener bolt to be pulled in practically free of play clearance.

BRIEF DESCRIPTION OF THE DRAWINGS

The invention will be described in further detail with reference to an illustrative embodiment represented in the drawings, in which.

DESCRIPTION OF PREFERRED EMBODIMENTS

Figure 1:
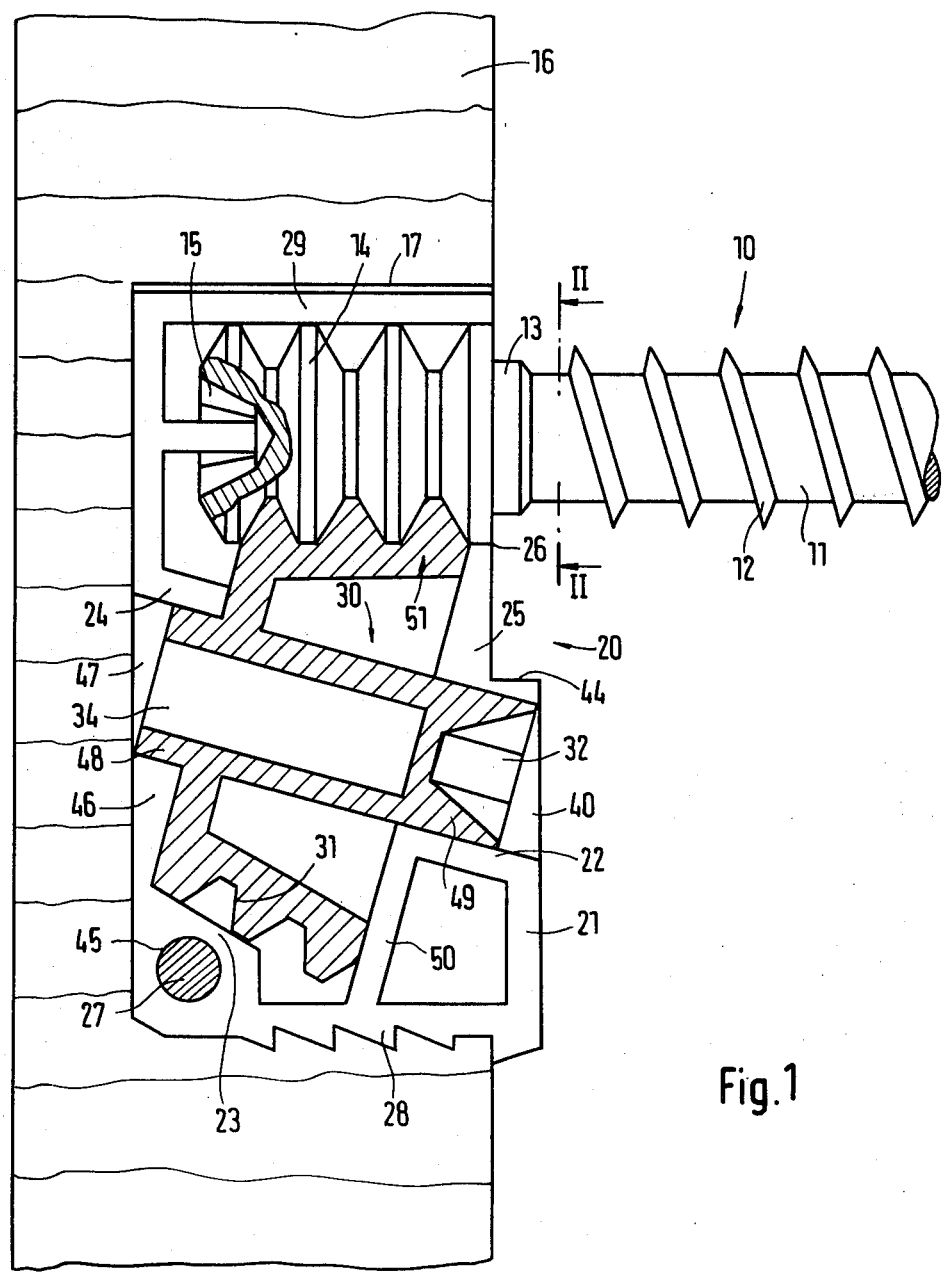
FIG. 1 is a sectional view of a fitting comprising a casing, a worm and a fastener bolt having a fastening head provided with and external ribs thereon, with the casing and the worm being recessed in a piece of furniture and the externally ribbed fastening head of the bolt being inserted in the casing.
Figure 2:
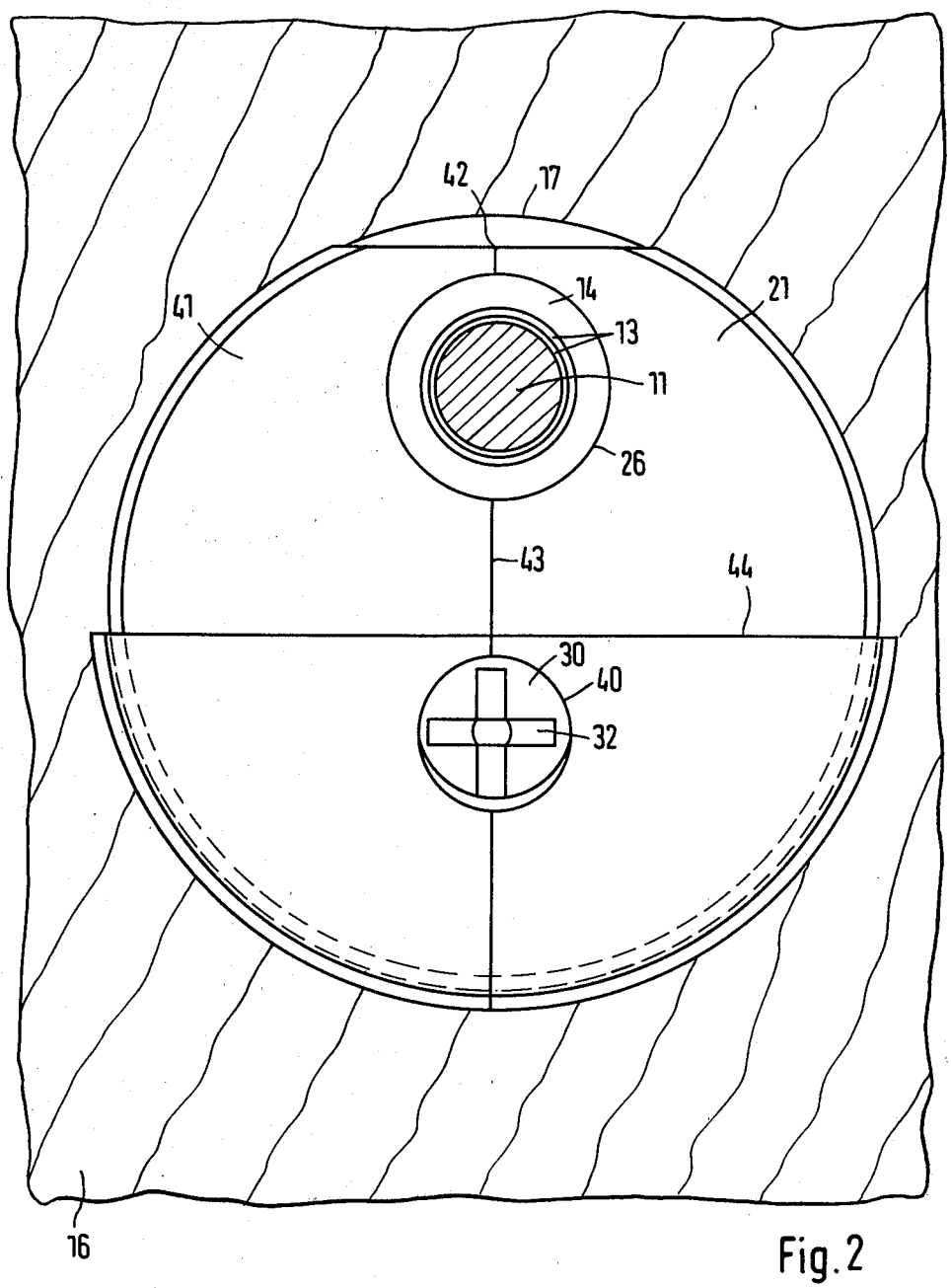
FIG. 2 is a view of the fitting along the line II—II of FIG. 1.

Referring to FIG. 1, the round housing or casing 20 is recessed in a cup-shaped cavity 17 in the side wall 16 of a piece of furniture. Casing 28 consists of two dish-shaped members 21 and 41, called "half-dishes", (FIG. 2). The sectional view of FIG. 1 extends along the plane of separation 43 of the two mirror image dish-shaped elements or half-dishes 21 and 41, which are joined in the region of the wall 29 of the cup-shaped recess by a so-called film hinge 42 to form one piece. To facilitate the molding of the interior configuration of the half-dishes 21 and 41 so as to be able to mold these elements with ease from a plastic material, without the use of a slide in the injection molding process, the two members 21 and 41 are molded in their straight or hinged-open position. The connection between the two half-dishes 21 and 41 is established in the plane of separation 43 by means of locking pins 27 which latch into recesses 45. The locking means serve to hold the two half-dishes 21 and 41 of the casing 20 together; however, the connection is made only after the worm 30 has been inserted into the casing 20.

The shank 11 of the fastener bolt or stud 10 is provided with a screw thread 12 by means of which it is retained in a bore of the furniture part which is to be vertically connected to the side wall 16 of another furniture body. The head of the fastener bolt 10 is formed with an exterior individual encircling ribs 14 adjacent the shoulder 13. The diameter of the external ribs 14 is greater than the diameter of the thread 12. External ribs 14 are made up of circumferentially extending individual ribs which are vertically oriented with respect to the longitudinal axis of the fastening bolt 10. The individual projecting ribs on the head have a cross section of an equilateral trapezoid with two parallel sides and bilaterally symmetrical. The front face of the ribbed head 14 of the fastener bolt 10 is provided with a tool receptacle 15, for instance in the form of a cross slot, to apply a tool for screwing the fastener bolt into the furniture.

As shown in FIGS. 1 and 2, the two half-dishes 21 and 41 form a receptacle 26 in the region of the plane of separation for receiving the externally ribbed fastening head. This receptacle 26 is confined by the casing elements 25 and 29 and is defined thereby. Further, the casing portions 22, 24, 25 and 46 constitute semi-cylindrical bearing elements 40 and 47 for the front side projections or shoulders 48 and 49 on the worm 30. The semi-cylindrical elements 40 and 47 will form cylindrical enclosures when the half-dishes 21 and 41 are put together to form the casing. By casing portions 23 and 50, the worm 30 at the same time is secured in the casing 20 against axial displacement, while retaining its rotatability. The tool receptacle 32 in the bearing shoulder 49 of the worm 30 remains accessible from the bearing element 40, as will be noted from FIG. 2.

The screw threads 31 of the worm 30 form an angle of about 30° with the rotational axis of the worm 30, so that they are in complete engagement with the external ribs 14 of the fastener bolt 10. The shape and the pitch of the screw threads 31 of the worm 30 match the ribs 14 of the fastener bolt 10 so as to achieve low clearance or play free engagement.

The exposed front sides of the half-dishes 21 and 41 form a horizontal ledge 44 which may serve as a support for the piece of furniture being secured by means of the fastener bolt 10. Securement of the assembled casing 20 in the cup-shaped cavity 17 in the side wall 16 is enhanced by conventional detent means in the form of sharp backward projections, or barbs, 28 provided on the outer circumference of the half-dishes 21 and 41.

Figure 3:
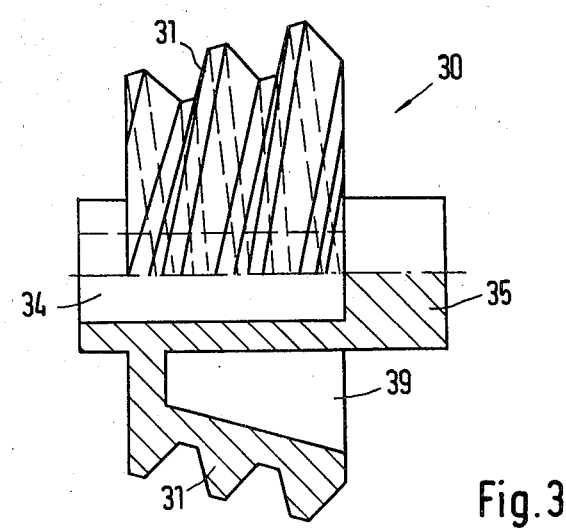
FIG. 3 is a lateral view of a worm partially in section.
Figure 4:
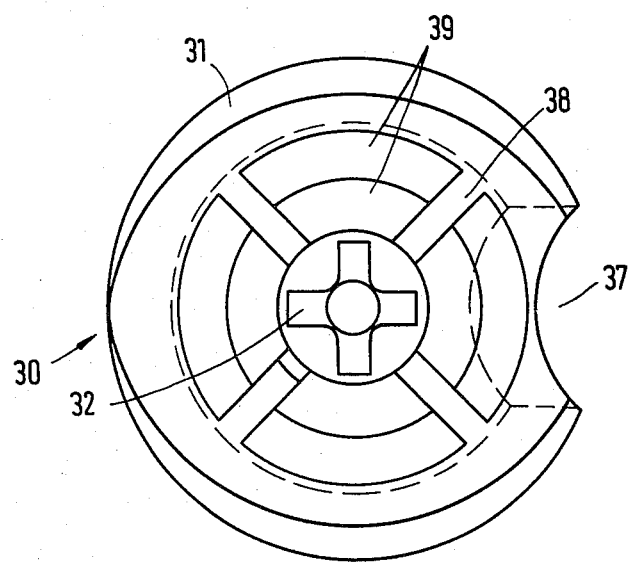
FIG. 4 shows the worm in a plan view of the accessible front side according to FIG. 3.

As shown in FIGS. 1, 3 and 4, the worm 30 may be provided with a blind-end bore 34 extending from the bearing shoulder 48. The bearing element 49 may also take the form of a socket 35, for driving worm 30, such as a hexagonal socket. The worm 30 is formed with hollow spaces or cutouts 39 adjacent the bearing element 49. These spaces are subdivided by radially extending bracing ribs or walls 38 are are connecting with the conically tapered threaded sleeve 51. Due to this particular construction it is possible to make the worm 30 by an injection molding process in one piece with an approximately uniform wall thickness.

It will further be noted that the worm 30 is formed with an axially extending groove or flute 37. This groove 37 conforms to the diameter of the external ribs 14 of the fastening head and its directed parallel to the threaded sleeve 51 of the worm 30. Thus, the worm 30 may be brought into a rotational position in which the groove 37 is flush with the receiving member 26 in the housing 20, so that the externally ribbed head of the bolt 10 may be inserted into the receiving member 26 at a distance until the furniture piece secured to the fastening bolt 10 abuts the casing 20. Turning the worm 30 and axially moving the fastening bolt 10 slightly, for compensation, will establish operative connection between the screw threads 31 of the worm 30 and the external ribs 14 of the fastening head. For the subsequent tightening of the worm 30 an adjustment angle of at least 270° is available which is in any case sufficient to effect a secure tightening of the fastener bolt 10.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. Connection fitting for disconnectible joining two vertically abutting pieces of furniture in their region of contact, in which one furniture piece is provided with a projecting fastener bolt having a fastening head thereon, and the other furniture piece is provided with a cup-shaped casing in a cavity, said casing enclosing rotatably mounted tensioning means, and in which the head of the fastener bolt is in operative connection with the tensioning means and is adapted to be pulled into the casing by the rotational movement of the tensioning means, characterized in that the fastening head of the fastener bolt (10) is provided with external ribs (14) the individual ribs being circumferential and perpendicularly directed to the longitudinal axis of the fastener bolt (10), the tensioning means being constructed in the form of a worm (30) the screw thread (31) of which are adapted to mesh with said external ribs (14) of the fastening bolt (10), and that the fastener bolt (10) is adapted to be inserted from the front side of the casing (20), and the worm (30) is rotatable from said front side.

2. Connection fitting according to claim 1, characterized in that said fastening head having external ribs (14) thereon is adapted to be inserted into a receiving member (26) in said casing (20) which is dimensioned to accommodate the diameter of said external ribs (14).

3. Connection fitting according to claim 1, characterized in that the rotational axis of said worm (30) is directed at an acute angle with respect to the longitudinal axis of said fastener bolt (10).

4. Connection fitting according to claim 1, characterized in that the angle between the rotational axis of said worm (10) and the longitudinal axis of said bolt (10) is 30°.

5. Connection fitting according to claim 1, characterized in that said casing (20) is comprised of two half-dishes (21 and 41), which are adapted to be joined together by locking means, preferably recesses (45) and pins (27), in the region of the plane of separation (43), and that the longitudinal axis of said fastener bolt (10) and the rotational axis of said worm (30) are located in the plane of separation (43) of said casing (20).

6. Connection fitting according to claim 5 characterized in that said casing (20) is round and the plane of separation (43) extends along a diameter.

7. Connection fitting according to claim 5, characterized in that said two half-dishes (21, 41) of said casing (20) are made of a plastic material and are connected at one end of the plane of separation (43) by means of a film hinge (42) to form one piece to be made in the hinged-out condition from a plastic material by injection molding.

8. Connection fitting according to claim 1, characterized in that the cross section of ribs (14) of the fastening head of said fastener bolt (10) is that of a trapexoid with two parallel sides, and that the screw threads (31) and the pitch of said worm (30) are adapted to conform to this shape of said ribs (14) of said fastener (10).

9. Connection fitting according to claim 5, characterized in that each of the two half-dishes of said casing (20) is formed in the region of the plane of separation (43) with semi-cylindrical bearing surfaces (40, 47) for bearing flanges (48, 49) of the worm (30), and that said front side bearing surfaces (40, 47) are formed by portions (22, 24, 25, 46) of the half-dishes (21) and form cylindrical enclosures when the two half-dishes (21, 41) are in their assembled condition.

10. Connection fitting according to claim 9, characterized in that said worm (30) is prevented from being axially displaceable by the portions (23, 24, 25, 46, 50) of said half-dishes (21, 41) but is rotatably maintained in the assembled casing (20).

11. Connection fitting according to claim 1, characterized in that said worm (30) is provided on its front face with a tool holder (32) accessible from the front side of said casing (20).

12. Connection fitting according to claim 1, characterized in that said worm (30) is provided on its circumference with a longitudinally directed groove (37) to facilitate the insertion of the externally ribbed fastening head (14), said groove being dimensioned to conform to the diameter of the external ribs (14) and extending parallel to the threads of said worm (30).

* * * * *